Nov. 20, 1962  C. E. ANDERSON ETAL  3,064,940
ECCENTRIC PLUG VALVE
Filed Sept. 3, 1959
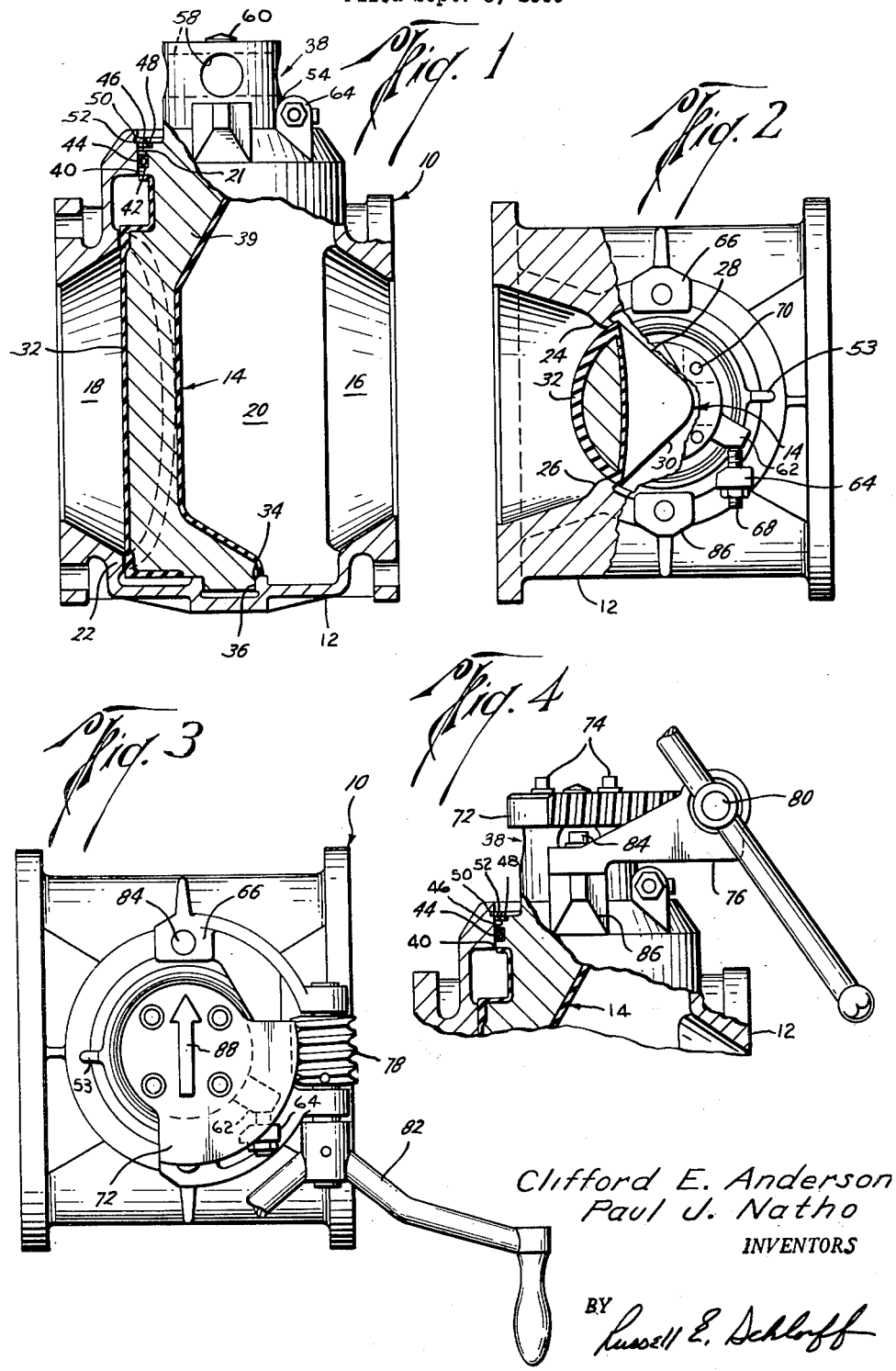
Clifford E. Anderson
Paul J. Natho
INVENTORS
BY
ATTORNEY United States Patent Office 3,064,940
Patented Nov. 20, 1962

3,064,940
ECCENTRIC PLUG VALVE
Clifford E. Anderson and Paul J. Natho, Houston, Tex., assignors to ACF Industries, Incorporated, New York, N.Y., a corporation of New Jersey
Filed Sept. 3, 1959, Ser. No. 837,998
4 Claims. (Cl. 251—249.5)

This invention relates generally to rotatable eccentric type plug valves and to the stem and bonnet assembly for rotatable plug valves.

The invention will be described for its preferred embodiment as a stem and bonnet assembly for an eccentric type plug valve, but it will be understood that, while it is particularly efficient in such combination, the stem and bonnet assembly itself is capable of other uses.

It is common in the valve art to provide a separable stem for rotatable plug valves. The stem passes through a hole in the cover plate or bonnet closing the valve chamber. It is necessary in such cases to provide packing around the stem and also around the cover plate or bonnet. In some instances, the stem is integral with the plug, however, it is still usual in such cases to provide a cover plate to close the valve chamber which again requires separate packing around both the stem and the cover plate. In all cases the opening is as large as the diameter of the valve member.

In the present invention, the diameter of the opening for the valve chamber is smaller than the diameter of the eccentric plug when it is trunnioned in position and means are provided to prevent lateral displacement of the plug before aligning with the opening for withdrawal. The stem for the plug is integral with the plug and serves as a combined bonnet, carrier for a neck seal, stop, wrenching device, mounting device for the sector of a worm gear operator and indicator. Combining all these functions as part of an integral stem provides a unitary item which is economical to manufacture, assemble and maintain.

It is the object of the present invention to provide for a rotatable eccentric plug valve having a seat engaging portion offset from the central axis of the valve chamber with a small opening on the central axis and an integral stem on the plug closing such opening.

It is another object to provide an eccentric type plug valve with means to permit lateral movement of the plug for aligning the plug with the opening for withdrawal.

It is another object to provide a rotatable plug valve wherein the stem is integral with the body of the plug and serves as a bonnet for the valve chamber, a carrier for the neck seal, a portion of the stop, a wrenching device, an indicator and a mounting device for the sector of a worm gear operator.

It is another object to provide a rotatable plug viave having an integral stem in which the stem serves as a bonnet closure for the valve chamber and a carrier for the neck seal.

It is a further object to provide a rotatable journalled eccentric plug valve having an integral stem which serves as a carrier for the neck seal and bonnet closure.

It is a further object to provide for a rotatable plug valve having an integral stem in which the stem serves as the bonnet closure for the plug chamber with a bearing plate between the stationary retainer ring of the closure and the rotatable plug.

It is a still further object to provide a rotatable plug valve having an integral stem which serves as a mounting means for the sector of a worm gear operator.

Other and further objects of the invention will be obvious upon an understanding of the illustrative embodiment about to be described, or will be indicated in the appended claims, and various advantages not referred to herein will occur to one skilled in the art upon employment of the invention in practices.

A preferred embodiment of the invention has been chosen for purposes of illustration and description and is shown in the accompanying drawings, forming a part of the specification, wherein:

FIG. 1 is an elevational view of the valve of the present invention partially in section.

FIG. 2 is a top plan view, partially in section, of the valve shown in FIG. 1.

FIG. 3 is a top plan view showing the valve disclosed in FIGS. 1 and 2 having a worm gear operator attached thereto.

FIG. 4 is a partial elevation showing the worm gear operator and top section of the valve of FIG. 3.

Referring now to the drawings, and especially to FIG. 1, it will be seen that the valve 10 is comprised of a body, generally designated as 12, having a plug, generally designated as 14. The valve shown is an eccentric plug valve; however, it should be understood that the invention can be utilized in all types of rotatable valves having a plug member which is turned by a stem.

The body 12 is provided with flow passages 16–18. The outer ends of the flow passages are provided with means for connecting the valve to a flow system as is well known in the art. Intersecting the flow passages 16–18, there is a valve chamber 20 having an opening 21. The valve chamber end of the passage 18 extends slightly into the valve chamber and is machined to form a continuous valve seat 22. As can be seen in FIGS. 1 and 2, the passage 18 flares inwardly from its outer end and the valve seat 22 is in the form of an oblong with rounded ends having a generally uniform width, see FIG. 1.

Valve seat 22 is eccentric in respect to the axis of rotation of valve member 12, see FIG. 2. Thus, the terminal side 24 of the valve seat 22 protrudes inwardly toward the center of the valve chamber 20 a greater distance than does the initial side 26. Accordingly, the radius of the valve seat 22 is more at its initial edge 26 than at its terminal edge 24, see FIG. 2. Correspondingly, the radius of the leading edge 28 of the seat engaging portion 32 of the valve member 14 is less than the radius of the trailing edge 30 thereby conforming with the eccentric contour of the valve seat 22. As previously mentioned, the seat is generally oblong in shape and the width of the valve seat is constant throughout.

The seat engaging portion 32 mates with the valve seat 22 in the closed position and rotates to a position substantially out of the line of flow in the open position. The seat engaging portion 32 of the valve member 14 may be provided with a resilient coating to insure that the valve member 14 will close tightly against seat 22. The lower end of the valve member 14 is generally triangular in cross section and is provided with a short cylindrical trunnion 34 for rotation in a bearing 36 formed in the bottom of the valve chamber 20. The trunnion 34 is concentric with the opening 21 of the valve chamber 20 whereas the axis of the seat engaging portion is offset therefrom. The upper end of the valve member 14 is an integral cylindrical stem 38 which is concentric with and cooperates with the opening 21. It is in the construction of this stem and its cooperation with the opening 21 and the top of the housing that the invention resides.

The stem 38 has a short cylindrical section 40 that is approximately the same diameter as the opening 21. The section 40 is provided with a groove 42 in which is positioned an O-ring 44. The O-ring 44 cooperates with the outer wall of its groove 42 and the wall of the opening 21 forms the neck seal for the valve preventing leakage of any fluid from the valve chamber 20. Since the section 40 of the stem 38 closes the opening 21, there is no necessity for a separate bonnet. Instead of a separate bonnet with the necessary fasteners therefor, there is a snap ring closure cooperating with the stem 38 and opening 21. To form the snap ring closure, the stem 38 above the section 40 is of a reduced diameter forming a shoulder 46 at which point is located a bearing ring 48. The opening 21 is provided with a groove 50 in which is positioned a retainer ring 52. The retainer ring 52 overlies and engages the bearing ring 48 to retain the valve member 14 securely within the valve. By having a separate bearing ring 48, the valve member 14 rotates on the bearing ring 48 and not on the retainer ring 52 and the possibility of the retainer ring 52 being disengaged is minimized, since the primary rotative movement is between the stem 21 and bearing ring 48 and retainer ring 52. To prevent water from accumulating in the well formed by the top of the body bearing ring and stem, notches 53 may be cut in the top of the body 12.

In order to keep the turning torque of the valve low, the stem 38 is made as small as possible and actually smaller in diameter than the cross sectional area of the seat engaging portion 32 of the plug 14 when it is trunnioned. Also, the seat engaging portion 32 is offset from the central axis of the chamber 20 whereas the opening 21 is concentric to the central axis of the chamber 20. Accordingly, the plug is provided with an angularly extending portion 39 located between the top of the seat engaging portion 32 and the cylindrical section 40. The housing is also provided with head room to allow the plug to be lifted sufficiently so that the trunnion 34 can be disengaged from its journal 36. To assemble the valve, the seat engaging portion 32 is inserted through the opening 21 and then moved laterally to engage the trunnion 34 with bearing 36, and simultaneously cylindrical section 40 aligns with opening 21. To disassemble the valve, the plug 14 is lifted up until the trunnion 34 disengages from its bearing 36. As previously mentioned, the housing has sufficient head room to permit the trunnion 34 to be disengaged at the same time, the cylindrical section 40 will be clear of the top of the housing 12 and the plug is then moved laterally until the seat engaging portion 32 aligns with the opening 21 at which time the plug can be removed.

The remainder of the stem 38 has a cylindrical portion 54. Near the top of the cylindrical portion, there are two intersecting passages 58—58 which are at right angles to each other. A bar can be inserted in either of these passages thereby forming a turning device for the valve. On top of the cylindrical portion 54 there is a cast arrow 60 which indicates whether the valve is open or closed. The valve operates on a quarter turn. To assure that the seat engaging portion 32 of the valve member will be in full contact with the seat in the closed position and is not blocking flow in the open position, a stop engaging portion 62 is cast on the cylindrical portion 54 which cooperates with cast stops 64 and 66 on the top of the body 12. Since it is important that there is full contact between the seat engaging portion 32 of the plug and the seat 22, the stop 64 for the closed position is made adjustable. The adjustability is provided by providing the stop 64 with a female thread and threading a rod 68 therethrough. If on assembly full contact of the plug and seat is not established, the rod 68 can be moved to allow the necessary rotative movement of the plug to provide full seat engaging contact.

The top of the cylindrical portion 54 is provided with four tapped holes 70 and if a worm gear operator is desired, the sector 72 for the operator may be slipped over the top of the cylindrical portion 54 and attached to it by threaded members 74 which engage with the holes 70. The mounting frame 76 for the worm 78, shaft 80 and handle 82 is attached to the top of the body 12 by threaded members 84 which are secured in threaded holes in stop 66 and boss 86 located opposite stop 66. The worm gear operator is mounted sufficiently high so that it does not interfere with the operation of the stops 64 and 66 thereby eliminating the necessity of stops on the worm gear operator. The sector 72 may be provided with an indicating arrow 88 to show the position of the valve.

As can be seen from the foregoing description, the stem 21 serves as a carrier for the O-ring 44 forming the neck seal and a bonnet closing the opening 21 of the valve chamber 20. It is provided with the stop engaging portion 62 of the positioning device, passages 58 to permit insertion of a turning bar, an indicating arrow 60 and a mounting device for the sector 72 of the worm gear operator.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. In a plug valve assembly, a body having a valve chamber with an opening therefor, opposed flow ports communicating with said valve chamber, a valve seat at one end of said chamber, the valve seat being eccentric with relation to the central axis of the valve, a rotatable valve member in said chamber having an eccentric seat engaging portion mating with said valve seat in the closed position and rotatable to a position substantially out of the line of flow in the open position, a base member attached to the lower end of the seat engaging portion, the base member having a trunnion journalled in a bearing formed in the bottom of the valve chamber, an angularly extending portion joining the top of the seat engaging portion to a cylindrical section forming the top stem, the cylindrical section journalled in the opening of the chamber, the seat engaging portion when trunnioned being of a greater diameter than the opening, the housing being of such height that the valve member can be lifted up and the bottom trunnion disengaged from its bearing and the angularly extending portion being of such height that the cylindrical section of the stem clears the opening when the valve member is disengaged so that the valve member can be laterally moved to align it with the opening.

2. In a plug valve assembly, a body having a valve chamber with an opening therefor, opposed flow ports communicating with said valve chamber, a valve seat at one end of said chamber, the valve seat being eccentric with relation to the central axis of the valve, a rotatable valve member in said chamber having an eccentric seat engaging portion mating with said valve seat in the closed position and rotatable to a position substantially out of the line of flow in the open position, a base member attached to the lower end of the seat engaging portion, the base member having a trunnion journalled in a bearing formed in the bottom of the valve chamber, an angularly extending portion joining the top of the seat engaging portion to a cylindrical section forming the top stem, the cylindrical section journalled in the opening of the chamber, the seat engaging portion when trunnioned being of a greater diameter than the opening, the housing being of such height that the valve member can be lifted up and the bottom trunnion disengaged from its bearing and the angularly extending portion being of such height that the cylindrical section of the stem clears the opening when the valve member is disengaged so that the valve member can be laterally moved to align it with the opening, the cylindrical section having an annular groove, an O-ring forming a seal for the valve chamber in said groove, the cylindrical portion being of reduced diameter above the annular groove forming a shoulder, the opening having an annular groove above the shoulder, a bearing ring on the shoulder, a retainer ring in the groove overlying the bearing ring to secure the valve member in the chamber.

3. In a plug valve assembly, a body having a valve chamber with an opening therefor, opposed flow ports communicating with said valve chamber, a valve seat at one end of said chamber, the valve seat being eccentric with relation to the central axis of the valve, a rotatable valve member in said chamber having an eccentric seat engaging portion mating with said valve seat in the closed position and rotatable to a position substantially out of the line of flow in the open position, a base member attached to the lower end of the seat engaging portion, the base member having a trunnion journalled in a bearing formed in the bottom of the valve chamber, a cylindrical section forming the top stem attached to the seat engaging portion, the cylindrical section journalled in the opening of the chamber, the seat engaging portion when trunnioned being of a greater diameter than the opening, the housing being of such height that the valve member can be lifted up and the bottom trunnion disengaged from its bearing so that the valve member can be laterally moved to align it with the opening, the cylindrical section provided with means to seal around the opening and a snap ring retainer cooperating with the stem and opening to secure the valve member in the chamber.

4. In a plug valve assembly a body having a valve chamber with an opening therefor, opposed flow ports communicating with said valve chamber, at least one valve seat surrounding one of said flow ports, a rotatable valve member insertable through the opening in said chamber and positioned in said chamber, said valve member having a seat engaging portion rotatable into and out of registry with said seat and a stem portion extending outward of said opening, means establishing a seal between said stem portion and said opening, diametrically opposed bosses on the top of said body adjacent said opening, one of said bosses forming a stop, an upwardly extending member on said body positioned between said bosses, said member provided with means to form an adjustable stop, said stem portion of said valve member provided with a stop engaging portion cooperating with said stop boss in the open position of the valve and with said adjustable stop means in the closed position of the valve, a sector for a worm gear operator attached to the top of the stem, a mounting frame containing a worm attached to the bosses, the mounting frame so constructed that operation of the worm gear does not interfere with the cooperation of the stop engaging portion with the stops.

References Cited in the file of this patent

UNITED STATES PATENTS

| | | |
|---|---|---|
| 412,166 | Dawson | Oct. 1, 1889 |
| 904,299 | Best | Nov. 17, 1908 |
| 1,136,276 | Scaife | Apr. 20, 1915 |
| 1,244,630 | Mitchell | Oct. 20, 1917 |
| 1,534,866 | Page | Apr. 21, 1925 |
| 2,043,971 | Marvin | June 9, 1936 |
| 2,711,302 | McWhorter | June 21, 1955 |
| 2,803,426 | De Zurik | Aug. 20, 1957 |
| 2,909,126 | Gordon | Oct. 20, 1959 |
| 2,916,254 | Wendell | Dec. 8, 1959 |

FOREIGN PATENTS

| | | |
|---|---|---|
| 895,194 | France | Mar. 27, 1944 |
| 1,111,699 | France | Nov. 2, 1955 |

OTHER REFERENCES

Ford Meter Box Company, Inc., Catalog No. 56, 1956, page 95. A copy of this catalog is in Division 39.